Patented Sept. 12, 1922.

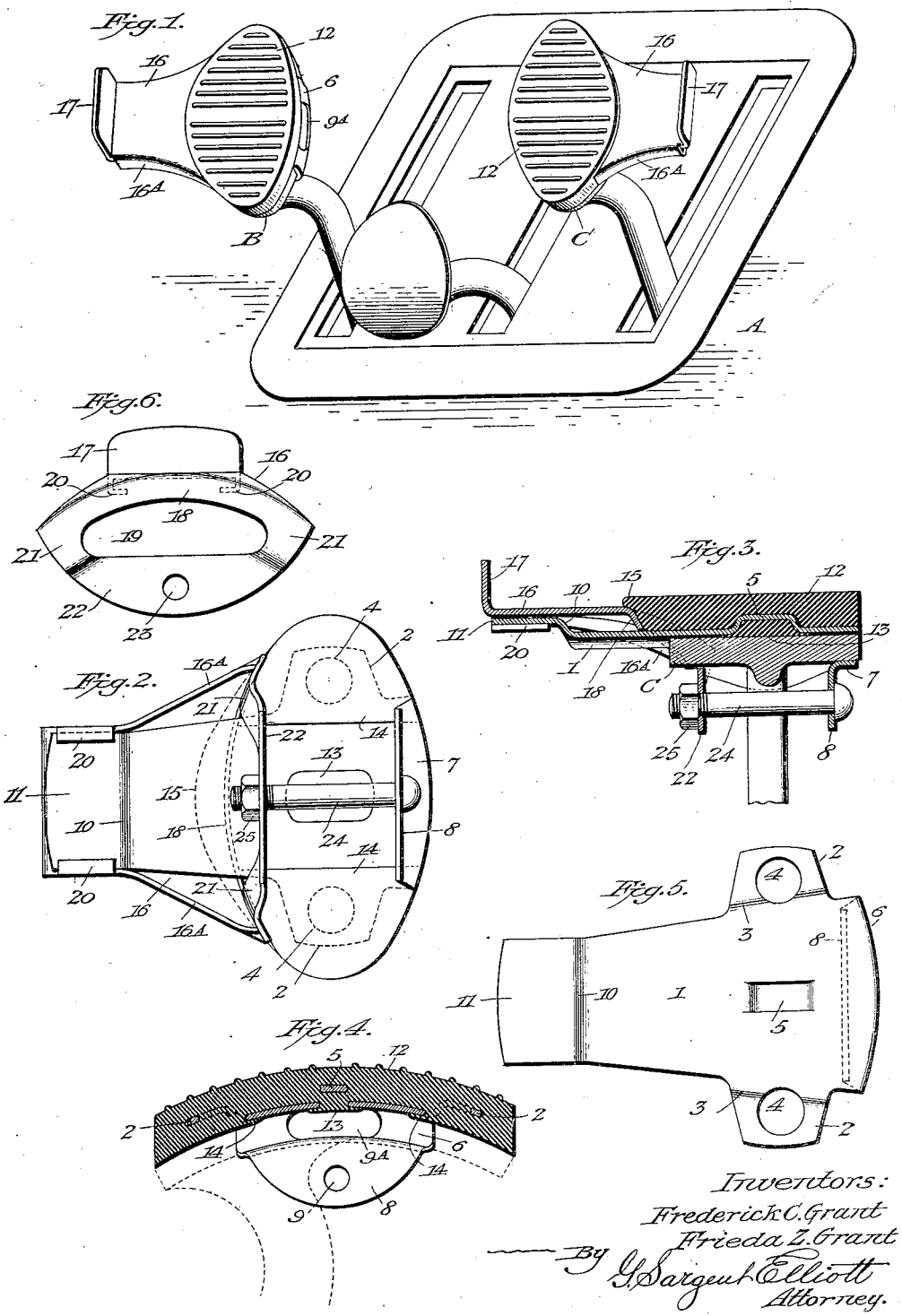

1,428,843

UNITED STATES PATENT OFFICE.

FREDERICK C. GRANT AND FRIEDA Z. GRANT, OF CHICAGO, ILLINOIS.

PEDAL ATTACHMENT FOR AUTOMOBILES.

Application filed July 28, 1920, Serial No. 399,547. Renewed July 3, 1922. Serial No. 572,740.

*To all whom it may concern:*

Be it known that we, FREDERICK C. GRANT and FRIEDA Z. GRANT, citizens of the United States of America, residing at Chicago, county of Cook, State of Illinois, have invented a new and useful Pedal Attachment for Automobiles, of which the following is a specification.

Our invention relates to improvements in attachments for automobile pedals.

The object of the invention is to provide a laterally extending attachment adapted to be secured upon the clutch and brake pedals of an automobile, to provide adequate foot support for the driver thereof; the said attachments extending in opposite directions, and being provided with vertical stops on their outer ends to prevent the driver's foot from slipping off of the attachment, means being provided for rigidly securing the said attachments to the pedals.

Further, to provide a foot supporting attachment for automobile foot pedals of a style in common use, comprising supporting plates having a sliding connection and means for clamping them upon the pedal, one of said plates having a foot stop on its outer end, the other plate having a rubber pad vulcanized thereon.

Further, to provide an attachment of this character, which is easily and quickly attached and detached, and which, when attached, is rigidly held against either lateral or endwise movement on the pedal.

These objects are accomplished by the device illustrated in the accompanying drawings, in which:

Figure 1 is a perspective view, showing the application of the improved pedal attachment.

Fig. 2 is a bottom plan view of one of the attachments, showing the parts assembled, as when clamped upon a pedal.

Fig. 3 is a longitudinal sectional view of the same, clamped upon a pedal.

Fig. 4 is a transverse sectional view through the attachment, taken centrally of the rubber pad.

Fig. 5 is a plan view of the plate to which the rubber pad is vulcanized, the pad being omitted. And Fig. 6 is an end view of the plate having the foot stop.

The attachment forming the subject of the present invention is adapted to be used in connection with a style of automobile foot pedals in common use, which are of a size and shape to afford inadequate support for the feet of the driver of the car. Furthermore, such pedals are not provided with anything in the nature of a stop to prevent lateral sliding movement of the feet, and as safety requires that the feet should be kept on the clutch and brake pedals, respectively, it is essential that such pedals should properly support the feet, and that they should be provided with suitable stops to keep the feet from slipping sidewise.

The present invention meets these requirements, by providing an attachment which provides ample foot support, and that prevents the feet from slipping, and which is easily and quickly attached and detached.

Referring to the accompanying drawings:

A designates the floor of the automobile, B the clutch pedal, and C the brake pedal.

The attachment is constructed and arranged as follows:

The numeral 1 indicates the main plate of the pedal attachment, or that which supports the pad. This plate is of the form shown clearly in Figure 5, and is curved transversely in an arc corresponding to the curvature of the pedal, upon which it rests, as shown in Figure 4, in which the pedal is indicated in dotted lines. This plate has oppositely positioned lateral wings or extensions 2, which, when the plate is in position upon the pedal, are in line with the longitudinal center of said pedal. These wings are bent slightly upward from the side edges of the plate, as shown at 3, and from the points 3, to their outer end, they have the same curvature as the plate. The extensions 2, are provided with holes 4, and midway between these holes, a raised strip or bridge 5, is formed in the plate, by cutting parallel slits in the plate, in line with its length, and pressing up the metal strip freed by the slits, so that it forms a bridge which is integrally connected at each end to the plate, but raised above the level of the same. The purpose of the holes 4, and the bridge 5, will be hereinafter explained.

The end of the plate, adjacent the wings 2, is bent down at right angles, as shown at 6, then inward a short distance, as shown at 7, then downward to form an ear 8, which is provided with a bolt hole 9. The bent portions 6 and 7, form clamping portions which engage the inner edge of a pedal, and the end 6, has the same curvature, in plan view, as the side edge of the pedal, which is substantially elliptical in form, while in end view it is of the same curvature as that of the plates, as will be understood by reference to Figures 4 and 6. The bent end 6, is formed with an opening 9^A, through which the side edge of the pedal may project slightly, which permits the solid part of the said end 6, to more firmly clamp the edge of the pedal, and also, by removing the metal to form the opening 9^A, the end 6, is more easily bent to conform to the curvature of the plate, than would otherwise be the case.

The plate 1, decreases in width from the wings 2, to a point adjacent its outer end, where the plate is given a slight upward bend, as shown at 10, from which point, to the adjacent end, it extends on a horizontal plane parallel with the remainder of the plate. The side edges of this raised end portion 11 of the plates are parallel.

Upon this plate 1, is secured a rubber foot pad 12, which is substantially elliptical in shape to conform to the shape of the pedal, and is also curved throughout its length, in an arc corresponding to the curvature of the pedal, as shown in Figure 4.

The pad is vulcanized on the plate 1, in any suitable manner, in which process it is given its proper size and shape.

In the vulcanizing process, the end portion of the plate 1, having the extensions 2, receives and supports the rubber pad, which is adhered thereto, the melted rubber passing under the bridge 5, and through the opening in the plate left by the pressing up of the bridge, and forming a button 13, on the under side of the plate, of slightly greater length and width than the hole left by the bridge, which button forms a retaining element for securing the central portion of the pad to the plate, as will be understood by reference to Figures 3 and 4. The melted rubber also passes through the holes 4 in the wings 2, of the plate, and under the said wings, and overlaps the under side of the plate for a short distance beyond each hole 4, as shown at 14, thus embedding the wings 2, centrally in the thickness of the pad. The overlapping portions 14, of the pad also adhere to the underside of the plate, and form an additional means of holding the pad firmly upon the plate. In the manner above described, the pad is securely attached to the plate without the employment of any other retaining means. The outer side edge of the pad extends a greater distance beyond the longitudinal center line of the pad than the other edge, as shown at 15, for a purpose to be hereinafter explained.

The other member 16, of the support, comprises a plate, which terminates at its outer end in a vertical foot stop 17, its inner end terminating in a downwardly bent portion and being curved along its bent edge in an arc corresponding to the edge 15, of the pad. This inner curved and depending portion comprises an inclined narrow lip 18, which bears against the adjacent edge of the pad, and below this lip, an opening 19, is formed in the depending portion, through which the adjacent side edge of the pedal projects slightly, when the attachment is clamped upon the pedal, and through which, also, the portion of the plate 1, beyond the pad, is passed; the end portion 11, of this plate 1, being supported in guideways 20, on the plate 16, which are formed by bending portions of the side edges of the said plate 16, downward and then inward, in the form of short angle plates, as shown in Figures 2 and 6. These guideways 20, hold the plate 16, in alinement with the plate 1, and the outer end portion 11, of the plate 1, braces the plate 16, against downward pressure.

The metal at each end of the opening 19, forms clamping members 21, which engage the adjacent edge of the pedal, when the attachment is secured thereon. Below the opening 19, the depending portion of the plate 16, terminates in a vertically disposed ear 22, having a bolt hole 23, which is in line with the bolt hole 9, in the ear 8, of the plate 1.

The plate 16, increases in width from the guideways 20 to the curved lip 18, and its side edges are bent at right angles, as shown at 16^A, to give rigidity to the plate.

In practice, the attachment is secured upon the pedal by first placing the plate 1, having the pad thereon, upon the pedal, with its downwardly bent end 6, and its inwardly bent lip 7, engaging one edge portion of the pedal. The plate 16, is then slipped over the extended portion of the plate 1, which passes through the opening 19, and the end 11, of the plate 1, enters the guideways 20, the curved lip 18, engaging the adjacent side edge of the rubber pad, while the clamping portions 21, engage the edge of the pedal which projects slightly through the opening 19, as clearly shown in Figure 3. The extended edge 15, of the foot pad overlaps the portion of the plate 16, adjoining the curved lip 18, as clearly shown in Figure 3, and thus covers the same when the lip 18, engages the side edge of the pad. A bolt 24, is then passed through the hole 9, in the ear 8, and also through the hole 23, in the ear 22, and a nut 25, is screwed upon the bolt against the ear 22, thereby locking the plates 1 and 16 together, and securely clamping them upon the pedal.

Having described our invention, what we claim as new and desire to secure by Letters Patent, is:

1. In a pedal attachment of the character described, the combination of a main plate bent to engage one edge of a pedal, an extension plate slidably mounted on said plate and adapted to engage the opposite edge of the pedal and means for clamping said plates to pedal.

2. In a pedal attachment of the character described, the combination of a main plate bent to engage one edge of a pedal, an extension plate slidably mounted on said plate, said extension plate formed with shoulders to engage the other edge of the pedal, and an upstanding stop on its outer end, and means for clamping said plates to a pedal.

3. In a pedal attachment of the character described, the combination of a main plate having at one end a downwardly turned extension to engage one edge of a pedal, an extension plate slidably mounted on said main plate, said extension plate formed with downwardly turned shoulders to engage the other edge of the pedal, and an upstanding stop on its outer end, and means on the under side of the pedal for clamping said plates to the latter.

4. In a pedal attachment of the character described, the combination of a main plate having at one end a downwardly turned extension to engage one edge of a pedal, and a depending ear on said extension, an extension plate slidably mounted on said main plate, said extension plate formed with downwardly bent shoulders to engage the other edge of the pedal, and with a depending ear beneath said shoulders, and means for drawing said depending ears tightly together whereby to clamp said plates on the pedal.

5. In a pedal attachment of the character described, the combination of a main plate having at one end a downwardly turned extension to engage one edge of the pedal, and a depending apertured ear on said extension, an extension plate slidably mounted on said main plate, said extension plate formed with downwardly bent shoulders to engage the other edge of the pedal and with a depending apertured ear beneath and connecting said shoulders, and a clamping bolt connecting said apertured ears.

6. In a pedal attachment of the character described, the combination with a pedal, of a plate bent to engage one edge and a portion of the adjacent under side of the pedal, and terminating in the depending apertured ear, a plate supported on the first plate, having a stop on its outer end and a portion for engaging the other edge of the pedal, which terminates in an apertured depending ear, a clamping bolt extending through said ears, and a rubber pad on the first plate.

7. In a pedal attachment of the character described, the combination with a pedal, of a plate adapted to rest thereon and extending beyond one side of the same, the other end of the plate being bent to engage the adjacent edge and a portion of the under side of the pedal and terminating in a depending apertured ear, a plate slidably supported on the extended end of the first plate, having a stop on its outer end and a portion which engages the other edge of the pedal and terminates in a depending ear, a bolt extending through said ears having a clamping nut, and a rubber pad vulcanized on said first plate.

8. In a pedal attachment of the character described, the combination with a pedal, of a plate bent at one end to engage one edge and a portion of the under side of the pedal and terminating in an apertured ear, its other end portion being extended beyond the other edge of the pedal, a plate slidably mounted on the extended part of the first plate, having a portion for engaging the said other edge of the pedal and which terminates in a depending apertured ear, the outer end of said latter plate being upturned to form a stop, a bolt extending through said ears having a clamping nut thereon, and a rubber foot pad vulcanized on said first plate, said plate having portions which are embedded in said pad.

9. In a pedal attachment of the character described, the combination with a pedal, of a plate bent at one end to engage one edge and a portion of the under side of the pedal and terminating in a depending ear, the other end portion of the plate extending beyond the opposite edge of the pedal, a rubber foot pad vulcanized upon said plate, portions of said plate being embedded in said pad, a plate slidably supported on the extended part of the first plate, having its outer end upturned to form a stop, its inner end being bent to form a pad engaging lip and a clamping portion for engaging the adjacent edge of the pedal, and terminating in an apertured depending ear, and a bolt extending through said ears having a clamp-nut thereon, said inner end having an opening through which the extended portion of the first plate passes.

10. In a pedal attachment of the character described, the combination with a pedal, of a plate, one end of which is bent to engage the edge and a portion of the under side of the pedal, and terminates in a depending apertured ear, its opposite end portion extending beyond the opposite edge of the pedal, said plate having raised lateral extensions, a rubber pad vulcanized on said plate so as to embed said lateral extensions, a plate slidably mounted on the extended end portion of the first plate, having an upturned outer end, its inner end being bent to form a pad engaging lip and a clamping portion for engaging the adjacent edge of the pedal and terminating in a depending apertured ear, said inner bent end portion having an opening through which the extended end portion of the first plate passes, and a bolt extending through said ears having a clamping nut thereon.

11. In a pedal attachment of the character described, the combination with a pedal, of a plate thereon adapted to engage one edge of the pedal, and extended beyond the opposite edge of the same, a plate slidably mounted on the extended part of the first plate, having a portion for engaging the adjacent edge of the pedal, and means for cooperatively clamping said plates upon the edges of said pedal, raised lateral extensions on said first plate having apertures thereon, a raised integral bridge pressed up from said plate centrally between the lateral extensions, and a rubber pad vulcanized on said plate so as to embed said lateral extensions and said bridge and extend beneath said bridge and anchor to the under side of the plate, said slidable plate also engaging one edge of said pad.

12. In a pedal attachment of the character described, the combination with a pedal, of a plate having a clamping end which engages one edge of the pedal and terminates in a depending apertured ear, its other end portion extending beyond the opposite edge of the pedal and terminating in a raised support, a bridge pressed up from said plate leaving an opening therein and raised lateral, apertured extensions on said plate in line with said bridge, a rubber pad vulcanized on said plate so as to embed said extensions and said bridge and extend beneath said bridge and anchor to the under side of the plate, a plate slidably mounted on the raised extended end support of the first plate and having guideways to receive said raised support, and terminating in an upturned outer end, its inner end being bent downward and having an opening for the passage of said extended end portion, and formed with a lip to engage the adjacent edge of the pad, and with a clamping portion to engage the edge of the pedal, and terminating in an apertured ear, a bolt extending through said ears, and a clamping nut thereon, said pad having an extension which overlaps said engaging lip.

13. In a pedal attachment of the charcter described, the combination with a pedal, a plate which has a pedal edge engaging end, its opposite end portion extending beyond the other edge of the pedal, a cooperating plate having a pedal engaging inner end provided with an opening through which the extended portion of the first plate passes, said seconod plate being slidably mounted on said first plate and having guides to receive the extended end of the first plate, and means for cooperatively locking said plates upon said pedal, of a rubber pad vulcanized on said first plate, portions of which are embedded in said pad, said pad being of the size and outline of said pedal, a lip on said second plate for engaging the adjacent edge of said pad, the outer end of said second plate terminating in an apertured stop.

14. In a pedal attachment of the character described, the combination with a pedal, cooperating supporting plates thereon, one of which is supported upon the other, and terminates at its outer end in a stop, and means for clamping said plates upon the pedal, of a rubber pad vulcanized upon the other plate so as to embed the side portions thereof, said pad being of the size and shape of the pedal.

15. In a pedal attachment of the character described, the combination with a substantially elliptical pedal which is curved along its long diameter, of a transversely arranged plate extending beyond the pedal on one side and adapted to engage the other side edge of the pedal, and having a central raised bridge, and lateral extensions, a plate slidably supported on the extended part of the first plate, the inner end of which is bent downward and conforms to the curvature of the pedal, and being provided with an opening through which the extended part of the first plate passes, and with a portion for engaging the adjacent edge of the pedal, and a curved lip, said pedal edge extending slightly through said opening, means for clamping said plates on said pedal, and a rubber pad vulcanized upon said transversely arranged plate, so as to embed the said lateral extensions and said bridge, one edge of said pad being engaged by said curved lip and being formed with an extension which overlaps said lip.

In testimony whereof we affix our signatures in presence of two witnesses.

FREDERICK C. GRANT.
FRIEDA Z. GRANT.

Witnesses:
MAX HOENLEIN,
MAUD SCHROEDER.